United States Patent
Kaneko et al.

(10) Patent No.: US 6,181,894 B1
(45) Date of Patent: Jan. 30, 2001

(54) COPYING APPARATUS CAPABLE OF CHANGING ORIGINAL FEED ORDER

(75) Inventors: Satoshi Kaneko; Akiyoshi Kimura, both of Kawasaki; Yoshiyuki Suzuki, Yokohama; Tadashi Suzuki, Tokyo; Shinichi Nakamura, Kawasaki; Yoshihiko Suzuki, Tokyo; Minoru Nada, Kawasaki; Satoru Kutsuwada, Yokohama; Kenji Kobayashi, Tokyo; Shokyo Koh, Kawasaki; Norifumi Miyake, Tokyo; Hirohiko Tashiro, Yokohama, all of (JP)

(73) Assignee: Canon Kabushiki Kaisha, Tokyo (JP)

( * ) Notice: Under 35 U.S.C. 154(b), the term of this patent shall be extended for 0 days.

(21) Appl. No.: 08/771,285

(22) Filed: Dec. 20, 1996

Related U.S. Application Data

(63) Continuation of application No. 08/498,781, filed on Jul. 5, 1995, now abandoned.

(30) Foreign Application Priority Data

Jul. 7, 1994 (JP) .................................................. 6-155807

(51) Int. Cl.[7] .................................................. G03G 15/00
(52) U.S. Cl. .............................. 399/82; 399/367; 399/373
(58) Field of Search .................................... 355/203, 204, 355/313, 319–321; 271/3.01, 3.05, 3.08, 3.14; 399/82, 85, 367, 373, 374

(56) References Cited

U.S. PATENT DOCUMENTS

| 4,184,671 | 1/1980 | Sasamori ................................ 271/18 |
| 4,531,831 | 7/1985 | Kitajima et al. . |
| 4,743,944 | 5/1988 | Tomosada et al. . |
| 4,772,917 | 9/1988 | Tani . |

(List continued on next page.)

FOREIGN PATENT DOCUMENTS

| 551823 | 7/1993 | (EP) . |
| 2-010376 | 1/1990 | (JP) . |

OTHER PUBLICATIONS

"Automatic Document Feeder", Emsworth, Research Disclosure, No. 348, p. 244 (Apr. 1993).

"Digital Copying Device With Recirculating Original Document Facility", Emsworth, Research Disclosure, No. 330, pp. 801–810, (Oct. 1991).

European Search Report.

*Primary Examiner*—William J. Royer
(74) *Attorney, Agent, or Firm*—Fitzpatrick, Cella, Harper & Scinto

(57) ABSTRACT

A copying apparatus includes an original feed unit for feeding originals stacked on the stacking position to an exposure position one by one, an exposure unit for exposing an image on the original fed to the exposure position, and an image forming unit for forming the image exposed by the exposure unit onto a sheet, the image forming unit being able to operate in a first mode for forming an image on a single original on a single sheet, and a second mode for forming images on a plurality of originals on a single sheet. The original feed unit includes a first feed unit for feeding the originals stacked at the stacking position in turn from the last page, and a second feed unit for feeding the originals stacked at the stacking position in turn from the first page. When the image forming unit operates in the first mode, the first feed unit feeds the originals. When the image forming unit operates in the second mode, the second feed unit feeds the originals.

10 Claims, 10 Drawing Sheets

U.S. PATENT DOCUMENTS

| | | |
|---|---|---|
| 4,792,828 | 12/1988 | Ozawa et al. . |
| 4,799,079 | 1/1989 | Ujino et al. . |
| 4,905,046 | 2/1990 | Tsunoi et al. . |
| 4,910,612 | 3/1990 | Yamazaki . |
| 4,992,827 | 2/1991 | Kobayashi et al. . |
| 5,006,904 * | 4/1991 | Matsuo et al. ................. 355/313 |
| 5,018,714 | 5/1991 | Honjo et al. . |
| 5,119,145 | 6/1992 | Honjo et al. . |
| 5,125,636 * | 6/1992 | Higashio et al. ................ 355/313 X |
| 5,282,000 | 1/1994 | Miyake et al. . |
| 5,339,134 * | 8/1994 | Nakamura et al. ............. 355/321 X |

\* cited by examiner

COPYING APPARATUS CAPABLE OF CHANGING ORIGINAL FEED ORDER

This application is a continuation of application Ser. No. 08/498,781, filed Jul. 5, 1995, now abandoned.

BACKGROUND OF THE INVENTION

1. Field of the Invention

The present invention relates to a copying apparatus capable of changing the original feed order.

2. Related Background Art

Conventionally, there is no image forming apparatus comprising an original feeder that can separate each one of a plurality of originals placed on an original table with their original surfaces facing up (to be referred to as a "face-up state" hereinafter) or their original surfaces facing down (to be referred to as a "face-down state" hereinafter) either from the uppermost or lowermost original in turn, and that can automatically feed the separated original to an image reading position.

Conventionally, there is provided an image forming apparatus comprising an original feeder, which separates each one of a plurality of originals placed on an original table in the face-up state only from the lowermost original in turn and automatically feeds the separated original to the image reading position, or an image forming apparatus comprising an original feeder, which separates each one of a plurality of originals placed on an original table in the face-down state only from the uppermost original in turn and automatically feeds the separated original to the image reading position.

However, in the image forming apparatus comprising the original feeder which separates each one of a plurality of originals placed on the original table in the face-up state only from the lowermost original in turn and automatically feeds the separated original to the image reading position, or the original feeder which separates each one of a plurality of originals placed on the original table in the face-down state only from the uppermost original in turn and automatically feeds the separated original to the image reading position, image formation is started from the last page of a bundle of originals. For this reason, when the image formation mode is a mode for forming images on both surfaces of sheets on the basis of one-side originals, image formation is started after the number of originals is temporarily counted to discriminate if the number of originals is an odd or even number, or after a user inputs data indicating that the number of originals is an odd or even number. Similarly, when the image formation mode is a mode for forming images on a plurality of originals on a single sheet, the number of originals is temporarily counted, or a user inputs the number of originals. Therefore, the efficiency of image formation is considerably impaired, or a user is required to perform cumbersome operations.

On the other hand, when an image forming apparatus has a function of facsimile-transmitting a read image, a function of storing a read image in a file, and a function of transferring an image to an external computer, and comprises an original feeder which separates each one of a plurality of originals placed on an original table in the face-up state only from the lowermost original in turn and automatically feeds the separated original to the image reading position, or an original feeder which separates each one of a plurality of originals placed on an original table in the face-down state only from the uppermost original in turn and automatically feeds the separated original to the image reading position, the original reading operation is started from the last page of the plurality of originals. For this reason, in the case of a facsimile apparatus for transmitting images from the first page or an image file apparatus for storing images from the first page, all the pieces of original information must be temporarily stored in an image memory, and thereafter, the stored information must be processed from the first page, resulting in an increase in cost of the overall apparatus.

SUMMARY OF THE INVENTION

It is an object of the present invention to provide a copying apparatus which can solve the above-mentioned problems.

It is another object of the present invention to provide a copying apparatus which can improve image formation efficiency without requiring cumbersome operations to a user, and can attain cost reductions of the apparatus itself since it can separate originals placed on an original table either from the uppermost or lowermost original.

Other objects and features of the present invention will become apparent from the following description taken in conjunction with the accompanying drawings.

DETAILED DESCRIPTION OF THE PREFERRED EMBODIMENTS (First Embodiment)

Figure 1:
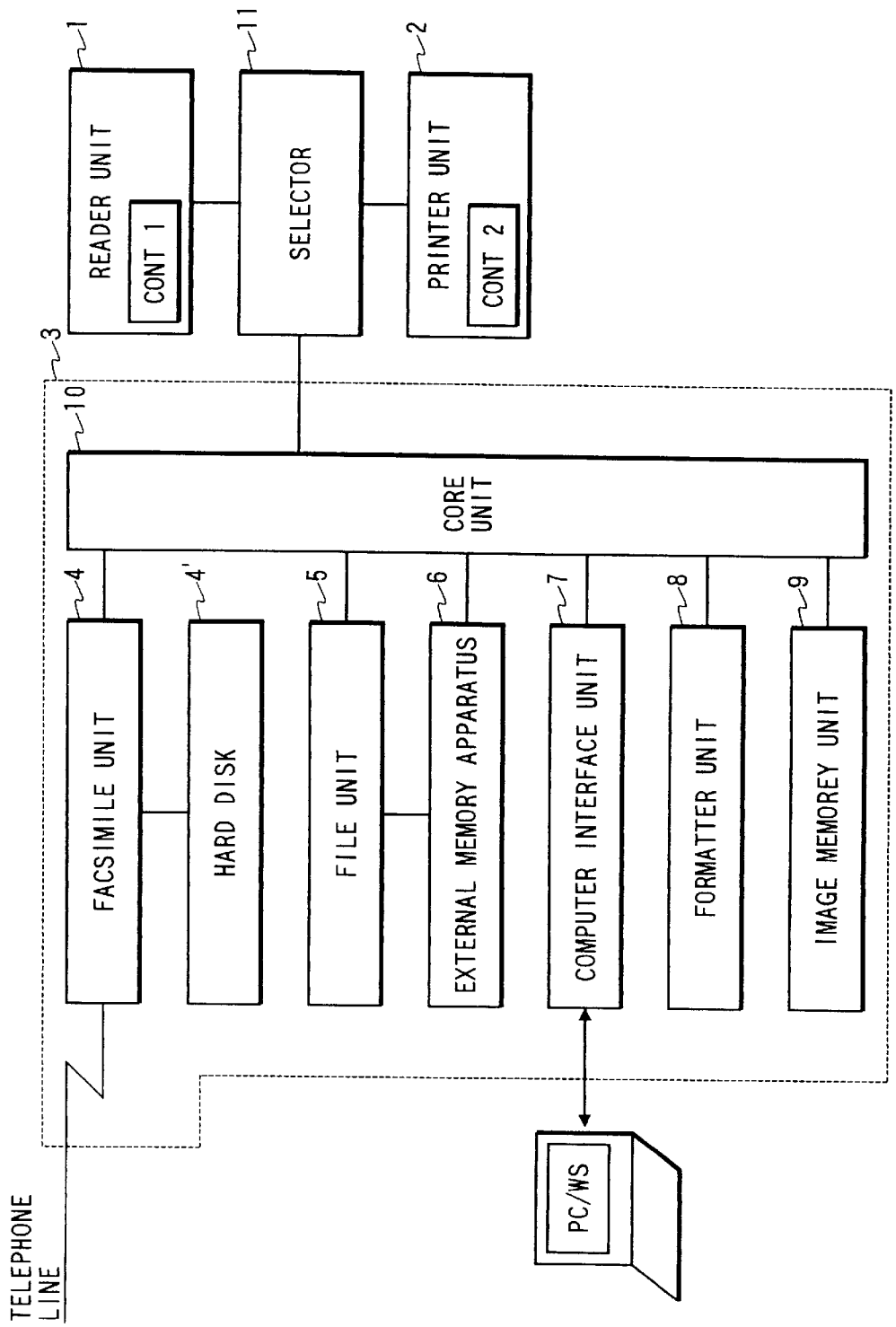
FIG. 1 is a block diagram showing the arrangement of an image forming apparatus according to the first embodiment of the present invention.

FIG. 1 is a block diagram showing the arrangement of an image forming apparatus according to the first embodiment of the present invention.

Referring to FIG. 1, an image input apparatus (to be referred to as a "reader unit" hereinafter) 1 serves as first image input means, and converts an original image into image data. An image output apparatus (to be referred to as a "printer unit" hereinafter) 2 serves as image output means, and has a plurality of different sheet stackers. The printer unit 2 outputs image data on a sheet as a visible image in response to a print command. An external apparatus 3 is electrically connected to the reader unit 1, and has various functions. More specifically, the external apparatus 3 serving as second image input means comprises a facsimile unit 4 for performing facsimile transmission/reception, a file unit 5 for converting various kinds of original information into electrical signals, and storing the converted signals in a magnetooptical disk, an external memory apparatus 6 connected to the file unit 5, a computer interface unit 7 for connection to a computer or a LAN, a formatter unit 8 for converting information from the computer into a visible image, an image memory unit 9 for temporarily storing information sent from the computer, a core unit 10 for controlling the above-mentioned functions, and the like. A reader controller CONT1 and a printer controller CONT2 can communicate with the core unit of the external apparatus 3, and each comprise a CPU, ROM, RAM, and the like.

As shown in FIG. 1, the external apparatus 3 is connected to the reader unit 1 using a cable via a selector 11, and the core unit 10 in the external apparatus 3 controls signals and respective functions.

Figure 2:
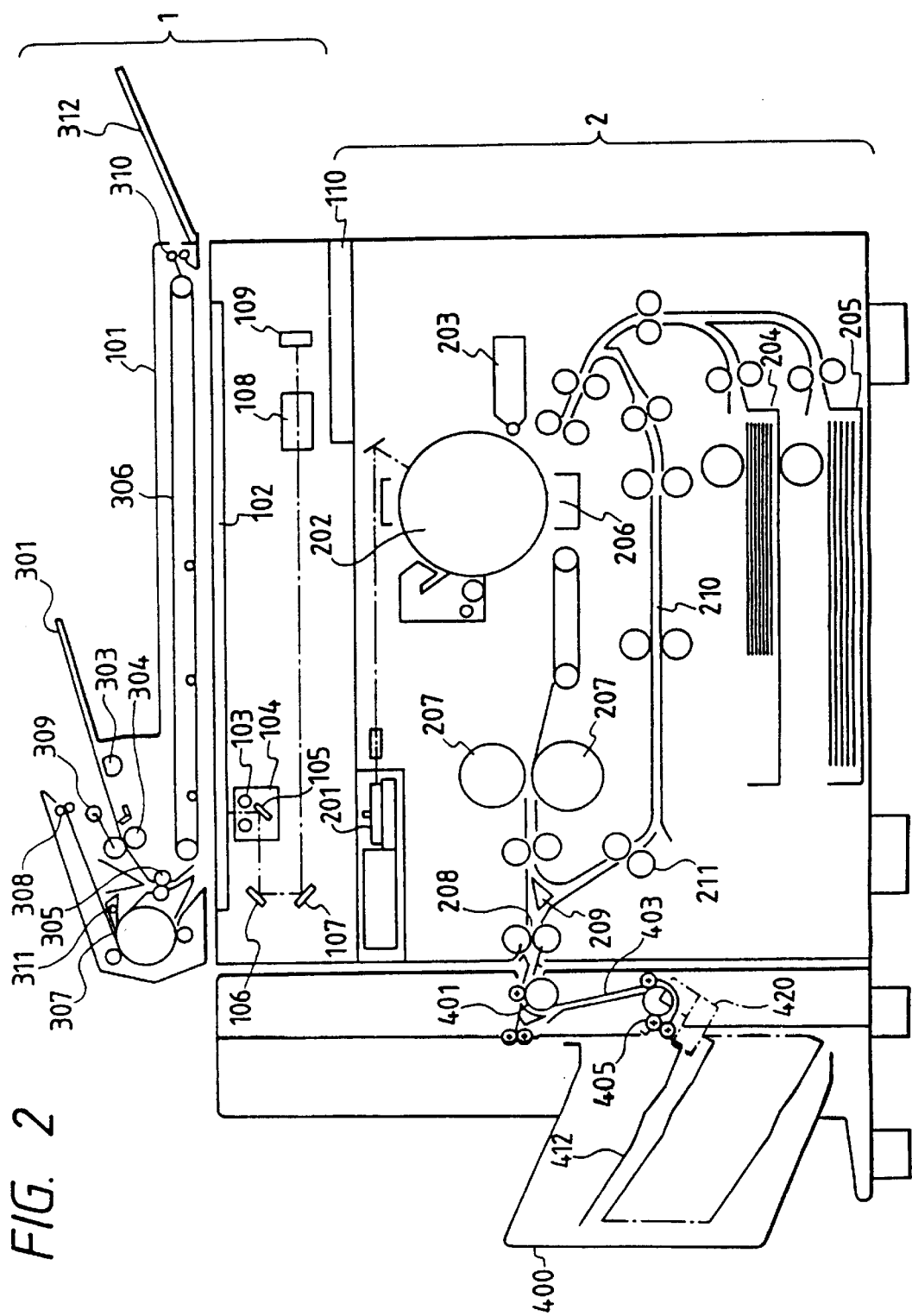
FIG. 2 is a sectional view showing the arrangement of a reader unit and a printer unit of the first embodiment.

FIG. 2 is a sectional view showing the arrangement of the first embodiment. The arrangement and operation of the first embodiment will be explained below.

Originals which are stacked, in the face-up state, on a stacker tray 301 of an original feeder 101 are sequentially conveyed one by one onto a platen glass 102. The stacker tray 301 has a widthwise direction regulating plate for regulating an original in its widthwise direction perpendicular to its feed direction so as not to skew the original in an original feed operation. The regulating plate is slidable in a direction perpendicular to the feed direction of the original.

A lower separation operation of a bundle of originals on the stacker tray 301 will be explained below. The bundle of originals are separated one by one from the lowermost original by a semicircular roller 303 and separation rollers 304, and the separated original is conveyed to the exposure position on the platen glass 102 by convey rollers 305 and an endless belt 306. Thereafter, an image reading operation is started. Upon completion of the image reading operation, the original on the platen glass 102 is returned to the uppermost surface of the bundle of originals by convey rollers 307 and exhaust rollers 308.

An upper separation operation of a bundle of originals on the stacker tray 301 will be explained below. The bundle of originals are separated one by one from the uppermost original by a pickup roller 309 and the separation rollers 304, and the separated original is conveyed to the exposure position on the platen glass 102 by the convey rollers 305 and the endless belt 306. Thereafter, an image reading operation is started. Upon completion of the image reading operation, the original on the platen glass 102 is exhausted onto an external exhaust tray 312 by external exhaust rollers 310.

In the case of a both-side original, the original is temporarily guided to the image reading position, as described above, and upon completion of the image reading operation, a pivotal flapper 311 is switched to the upper side to guide the leading end of the original to a path defined by the flapper 311. Thereafter, the original is conveyed onto the platen glass 102 by the convey rollers 305 and the endless belt 306. More specifically, the original is reversed upon rotation of the convey rollers 307.

When the original is conveyed to a predetermined position on the platen glass 102, a lamp 103 of a scanner unit 104 is turned on, and the scanner unit 104 moves to irradiate light onto the original. Light reflected by the original is incident on a CCD image sensor (to be referred to as a "CCD" hereinafter) 109 via mirrors 105, 106, and 107, and a lens 108.

An image processing unit 110 performs image processing set by an operation unit. The image processing unit 110 has an image memory, and has a function of rotating the output direction of an image. Note that an external switching circuit of the image processing unit 110 comprises the selector 11 for switching a signal from the reader unit 1 to the printer unit 2 or the external apparatus 3, and has a function of selecting one of signals from the reader unit 1 and the external apparatus 3 and connecting the selected signal to the printer unit 2.

An electrical signal connected to the printer unit 2 by the external switching circuit of the image processing unit 110 is converted into a modulated optical signal by an exposure control unit 201, and the converted optical signal is irradiated onto a photosensitive body 202. A latent image formed on the photosensitive body 202 by the irradiated light is developed by a developer 203. A sheet is conveyed from a sheet stacker 204 or 205 in synchronism with the timing of the leading end of the latent image, and the developed image is transferred onto the conveyed sheet by a transfer unit 206. The transferred image is fixed on the sheet by a fixing unit 207, and thereafter, the sheet is exhausted outside the apparatus by an exhaust unit 208.

The sheet output from the exhaust unit 208 enters a staple sorter 400.

The staple sorter 400 has a 20-bin stationary tray 412, and performs sorting.

In a sort mode, copied sheets are sequentially exhausted from the exhaust unit 208 of the main body, enter convey rollers 401 of the sorter 400, and are exhausted onto the respective bins of the tray 412 via a convey path 403 and exhaust rollers 405. Every time a sheet is exhausted onto a bin, the bins are vertically moved by a bin shift motor (not shown), thus performing sorting. On the other hand, when the staple mode is selected, and a staple signal is input from the printer unit, the sheets on each bin are stapled by a stapler 420 while moving the bins one by one by the bin shift motor.

Subsequently, a method of outputting sequentially read images on the two surfaces of a single sheet will be explained below.

After a sheet fixed by the fixing unit 207 is temporarily conveyed to the exhaust unit 208, the convey direction of the sheet is reversed, and the sheet is conveyed to a re-feed sheet stacker 210 via a convey direction switching member 209. When the next original is prepared, the original image is read in the same manner as in the above-mentioned process. In this case, since the sheet is fed from the re-feed sheet stacker 210, two original images can be consequently output onto the upper and lower surfaces of the single sheet.

A method of reversing and exhausting a sheet will be explained below.

A sheet on which an image is fixed by the fixing unit 207 is conveyed to reversal rollers 211 by temporarily pivoting the convey direction switching member 209 upward. After the sheet has passed the convey direction switching member 209, the reversal rollers 211 are rotated in the reverse direction to convey the sheet to the exhaust unit 208. When originals which are placed in the face-up state and are fed from the original feeder by the upper separation are to be copied, copied sheets are exhausted in the above-mentioned manner so as to prevent the page order of the copied sheets from being reversed.

Figure 3:
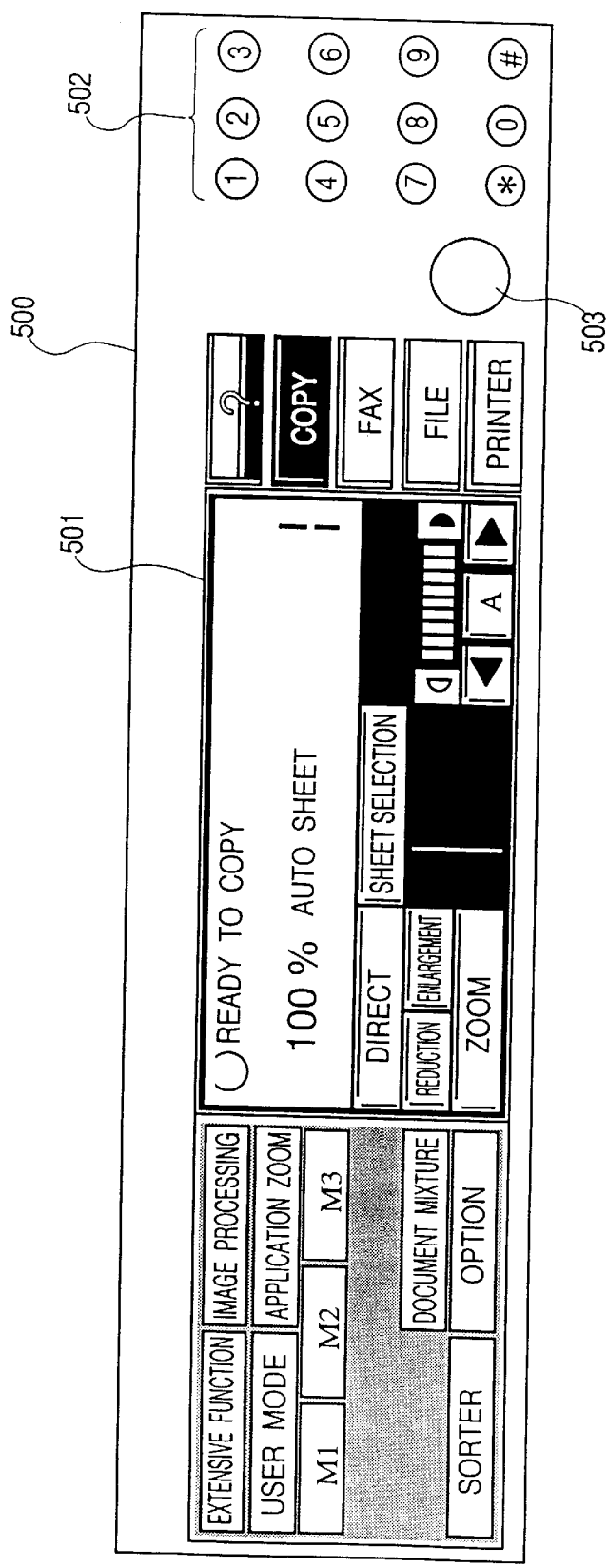
FIG. 3 is a plan view of an operation panel of the first embodiment.

FIG. 3 is a plan view showing an example of an operation panel 500 disposed on the reader unit 1 shown in FIG. 1.

Referring to FIG. 3, a display unit 501 displays operation states and messages. The surface of the display unit 501 comprises a touch panel, which serves as function keys when it is touched. A ten-key pad 502 is used for inputting numeric values. A start key 503 is used for starting an operation when it is depressed.

The operation will be described below with reference to the flow charts shown in FIGS. 4 to 9.

Figure 4:
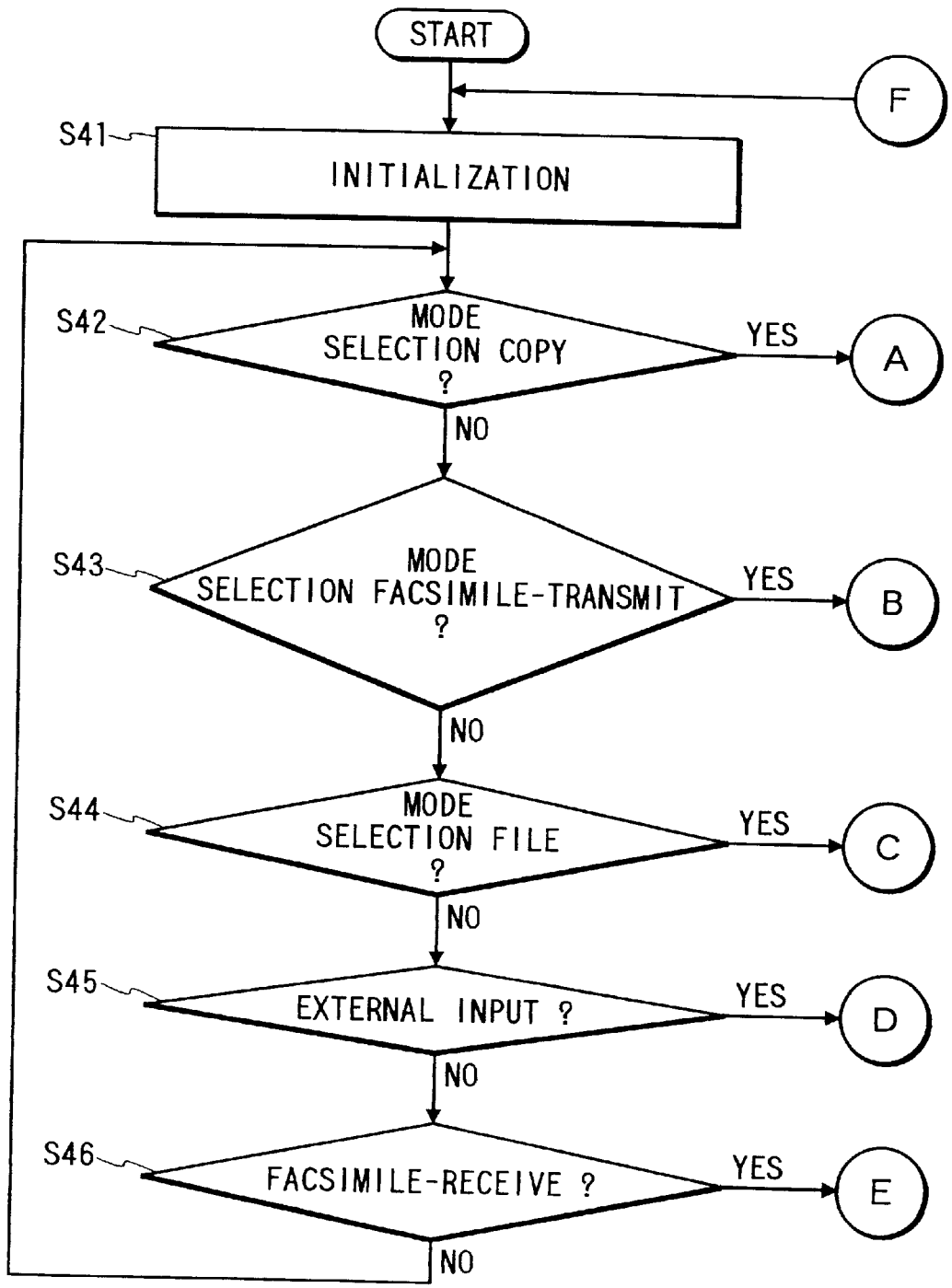
FIG. 4 is a flow chart showing the operation sequence of the entire system.

Referring to FIG. 4, initialization is performed after the power switch is turned on (step S41). Operation mode selection keys are displayed on the display unit 501 on the operation panel, and an operation mode is selected when the panel on the corresponding selection key is touched. It is checked if the selected mode is the copy mode (step S42). If YES in step S42, the flow jumps to step A; otherwise, it is checked if the selected mode is the facsimile-transmit mode (step S43). If YES in step S43, the flow jumps to step B; otherwise, it is checked if the selected mode is the file mode (step S44). If YES in step S44, the flow jumps to step C; otherwise, it is checked if an input from the computer interface is detected (step S45). If YES in step S45, the flow jumps to step D; otherwise, it is checked if facsimile data is received (step S46). If YES in step S46, the flow jumps to step E; otherwise, the flow returns to decision step S42 of checking if the copy mode is selected. Thus, decision steps S42 to S46 of the selected mode are repeated.

Figure 5:
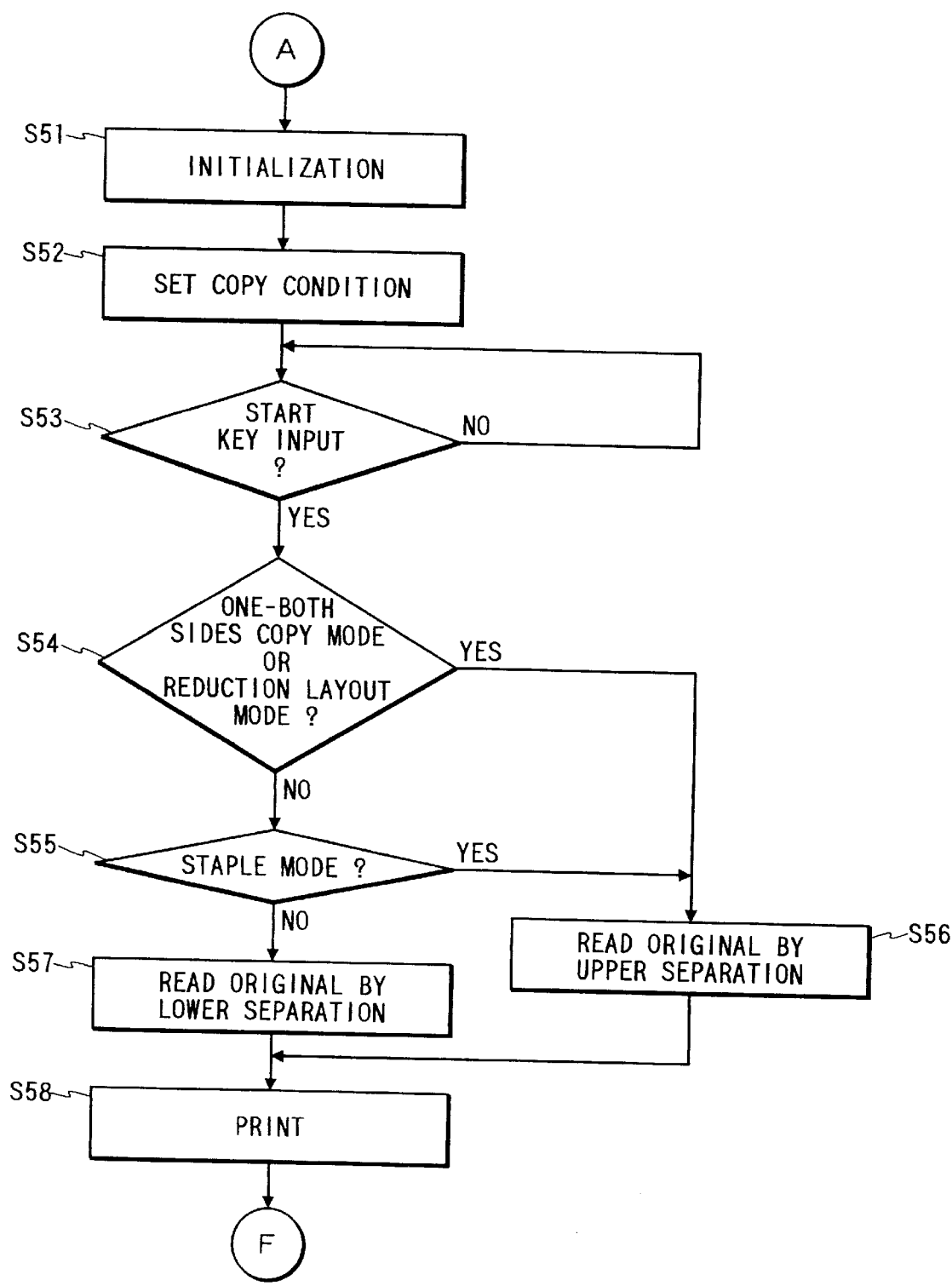
FIG. 5 is a flow chart showing the operation sequence in a copy mode.

FIG. 5 is a flow chart showing the operation sequence in the copy mode.

Initialization of the copy operation is performed (step S51). Information input from the operation panel 500 using the keys of the display unit 501 and the ten-key pad 502 is read to set a copy condition (step S52), and the control waits for an input of the start key 503 (step S53). When the start key 503 is depressed, if the copy condition set in step S52 corresponds to a mode for copying a plurality of pages of original images on a single sheet such as a one-both sides copy mode for copying images on one-side originals to the two surfaces of a sheet, a reduction layout mode for copying a plurality of original images on one surface of a sheet, or the like, originals are fed from the first page by the upper separation operation (steps S54 and S56). If the copy condition set in step S52 corresponds to the staple mode, originals are fed from the first page by the upper separation operation (steps S55 and S56). On the other hand, if the copy condition set in step S52 corresponds to a mode for copying one original image onto a single sheet, originals are fed from the last page by the lower separation operation (step S57). Furthermore, if the lower separation operation and the reversal exhaust operation are performed, automatic density control is performed, original images are read by the reader unit 1, and image data are printed by the printer unit 2 (step S58). The print operation is as described above. After the print operation, the flow returns to step S41 in FIG. 4 to perform initialization. In the copy mode such as the one-both sides copy mode or the reduction layout mode, when originals are fed from the last page by the lower separation, originals must be fed without performing a reading operation, and the number of originals must be counted so as not to form a blank page before the first page of the recorded sheets. However, according to the present invention, since this count operation can be omitted, the processing time can be shortened. In the lower separation operation, recorded sheets are exhausted in the face-up state without being reversed, and in the upper separation operation, recorded sheets are reversed, and are exhausted in the face-down state.

Figure 6:
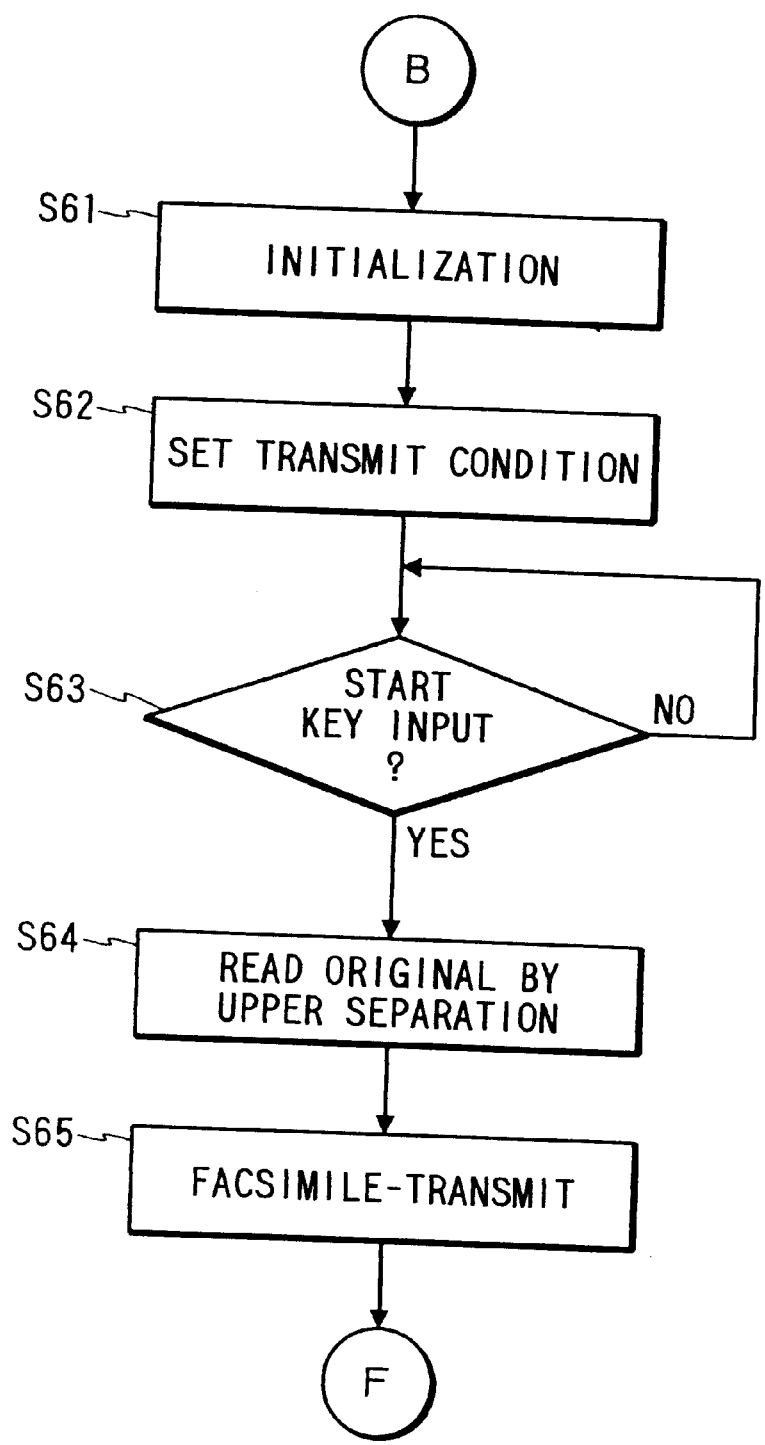
FIG. 6 is a flow chart showing the operation sequence in a facsimile-transmit mode.

FIG. 6 is a flow chart showing the operation sequence in the facsimile-transmit mode.

Initialization of the facsimile transmission operation is performed (step S61), and information input from the operation panel 500 using the keys of the display unit 501 and the ten-key pad 502 is read to set a facsimile-transmit condition (step S62). The control waits for an input of the start key 503 (step S63). When the start key 503 is depressed, originals are fed in turn from the first page by the original feeder 101 by the upper separation operation, and original images are read by the reader unit 1 (step S64). The read image data are supplied to the facsimile unit 4. The facsimile unit 4 performs facsimile transmission in accordance with the selected mode and a predetermined protocol (step S65). After the transmission, the flow returns to step S41 in FIG. 4 to perform initialization.

Figure 7:
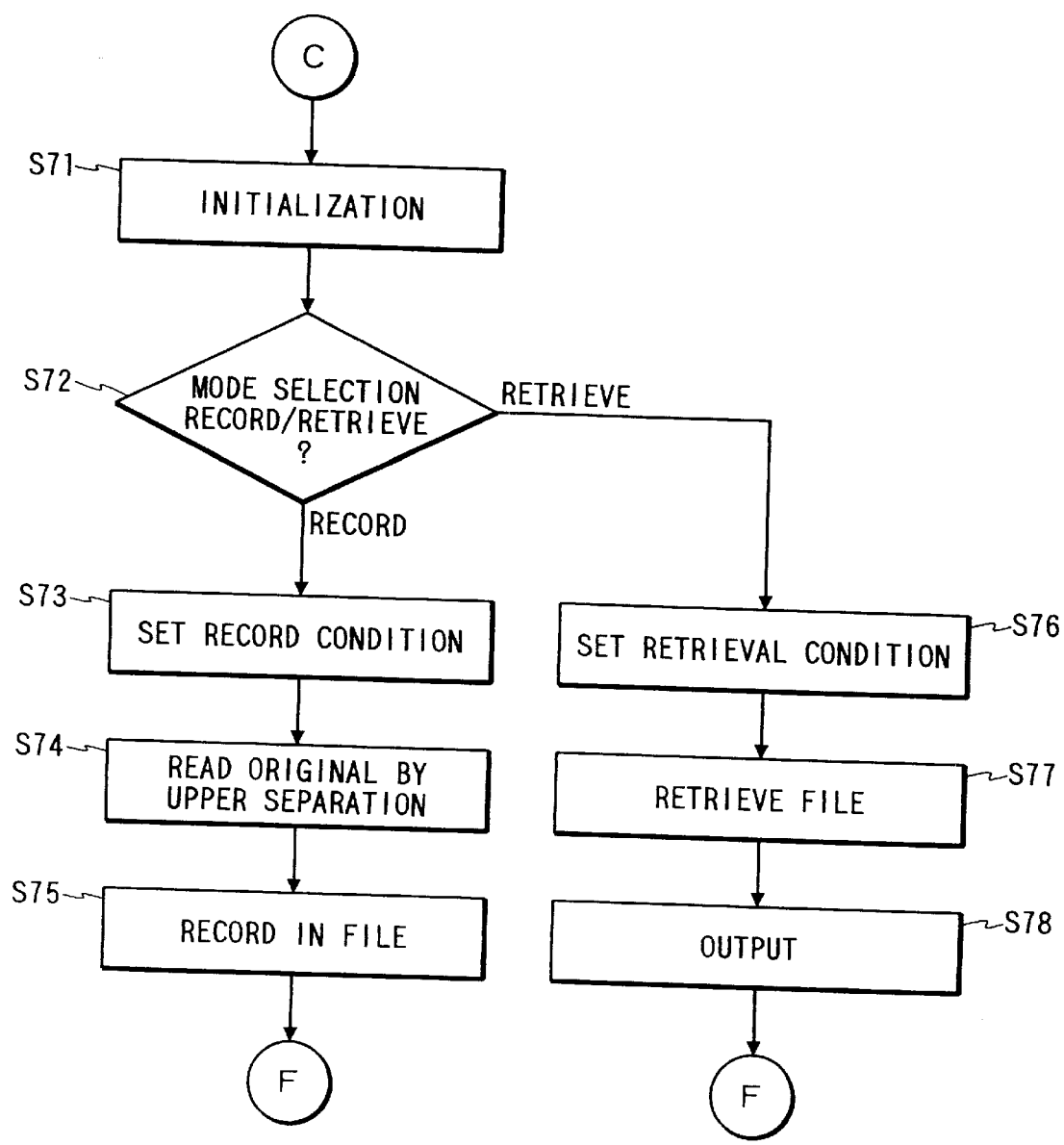
FIG. 7 is a flow chart showing the operation sequence in a file mode.

FIG. 7 is a flow chart showing the operation sequence in the file mode.

Initialization of the file operation is performed (step S71), a mode selection key for selecting one of the file record mode and the file retrieve mode is displayed on the operation panel 500, and the control waits for a key input (step S72). If the record key is selected, a record condition is set (step S73). Then, originals are fed in turn from the first page by the upper separation operation from the original feeder 101, and original images are read by the reader unit 1 (step S74). The read data are supplied to the file unit 5, and are recorded in a file in the external memory apparatus 6 (step S75). If the file retrieve key is selected in step S72, a retrieve condition is set (step S76), a file is retrieved from the external memory apparatus 6 (step S77), and the retrieved result is output (step S78). After the record or retrieve operation, the flow returns to step S41 in FIG. 4 to perform initialization.

Figure 8:
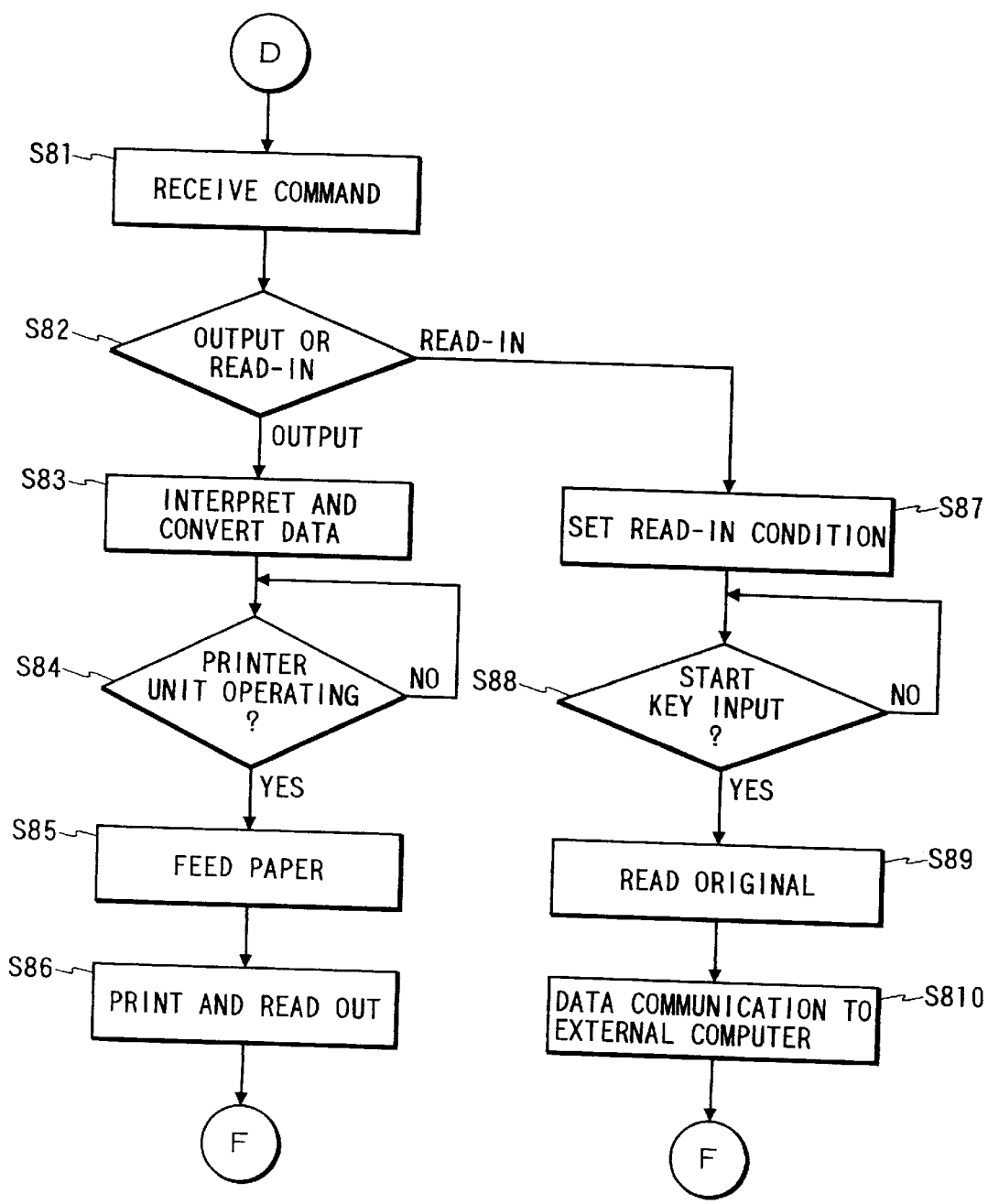
FIG. 8 is a flow chart showing the operation sequence upon reception of command data from an external apparatus to a computer interface.

FIG. 8 is a flow chart showing the operation sequence when command data is input from an external apparatus to the computer interface.

A command is received by the computer interface (step S81). It is checked if the received command requests a read-in operation to the computer or an output operation from the computer (step S82). If the command requests an output operation from the computer, data is supplied to and interpreted by the formatter unit 8 via the core unit 10, and information is developed onto a bit map memory (step S83). Subsequently, in the processing in step S84, it is checked if the printer unit is operating, and the control waits for the completion of the operation. Upon completion of the operation, a proper sheet is selected, and its feed operation is started. Then, the sheet is fed from the sheet stacker 204 or 205 to the position of the transfer unit 206 (step S85). The image developed onto the bit map memory by the processing in step S82 is rotated in correspondence with information such as the direction, size, and the like of the sheet, and the rotated image is read out. The readout image information is supplied to the exposure control unit 201, and is printed on the sheet (step S86). The print operation is the same as the operation described above. After the data is output, the flow returns to step S41 in FIG. 4 to perform initialization.

On the other hand, if the command received in step S82 requests a read-in operation to the computer, a read-in condition is set on the basis of data from the computer (step S87), and the control waits for an input of the start key 503 (step S88). Upon depression of the start key, originals are fed in turn from the first page from the original feeder 101 by the upper separation operation, and original images are read by the reader unit 1 (step S89). The read image data are supplied to the external computer (step S810). After the transfer operation, the flow returns to step S41 in FIG. 4 to perform initialization.

Figure 9:
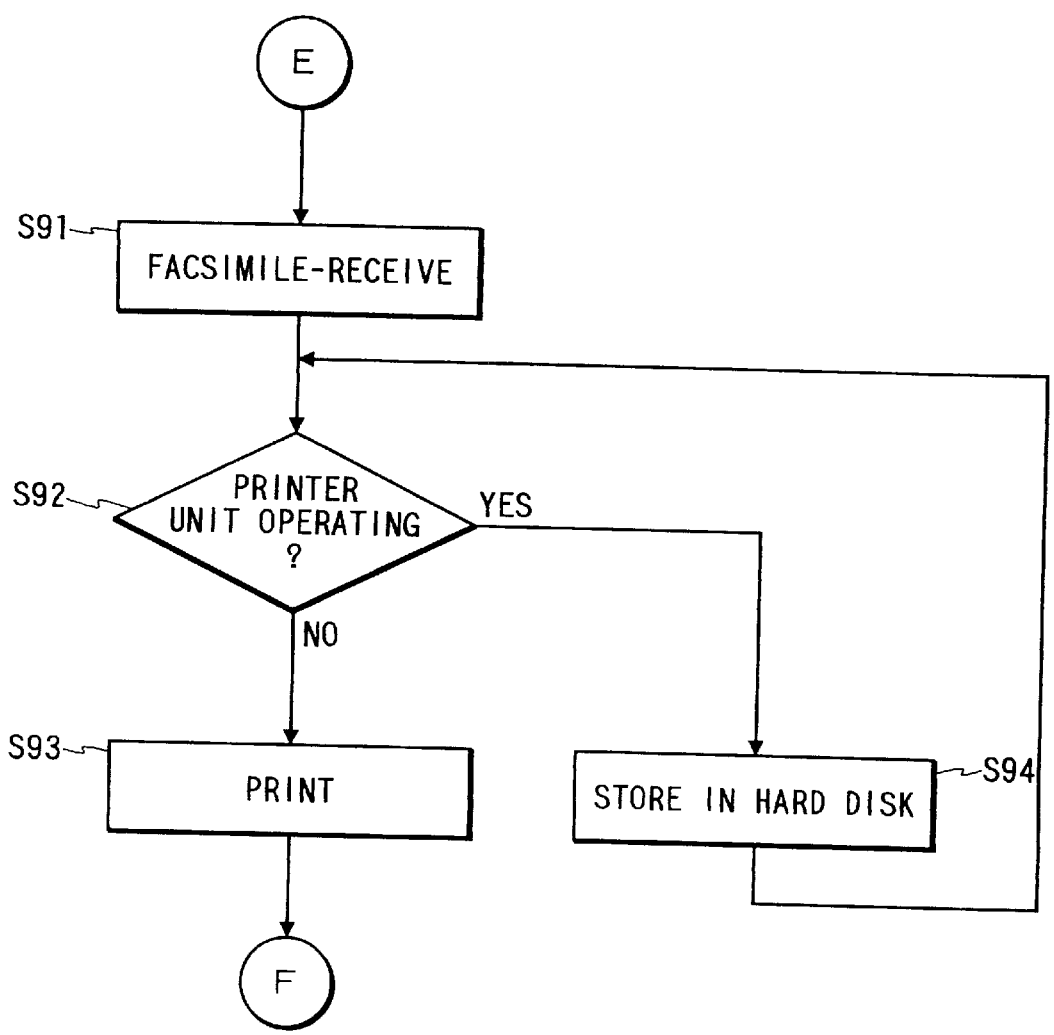
FIG. 9 is a flow chart showing the operation sequence in a facsimile-receive operation.

FIG. 9 is a flow chart executed when a facsimile-receive operation is performed.

A facsimile-receive operation is performed by the facsimile unit 4 (step S91), and it is checked if the printer unit 2 is operating (step S92). If NO in step S92, received data is supplied to the printer unit 2 and is printed (step S93). However, if YES in step S92, the received data is stored in a hard disk 4' in the facsimile unit 4 (step S94), and is printed out when the printer unit 2 is not busy (steps S92 and S93). After the print operation, the flow returns to step S41 in FIG. 4 to perform initialization.

(Second Embodiment)

Figure 10:
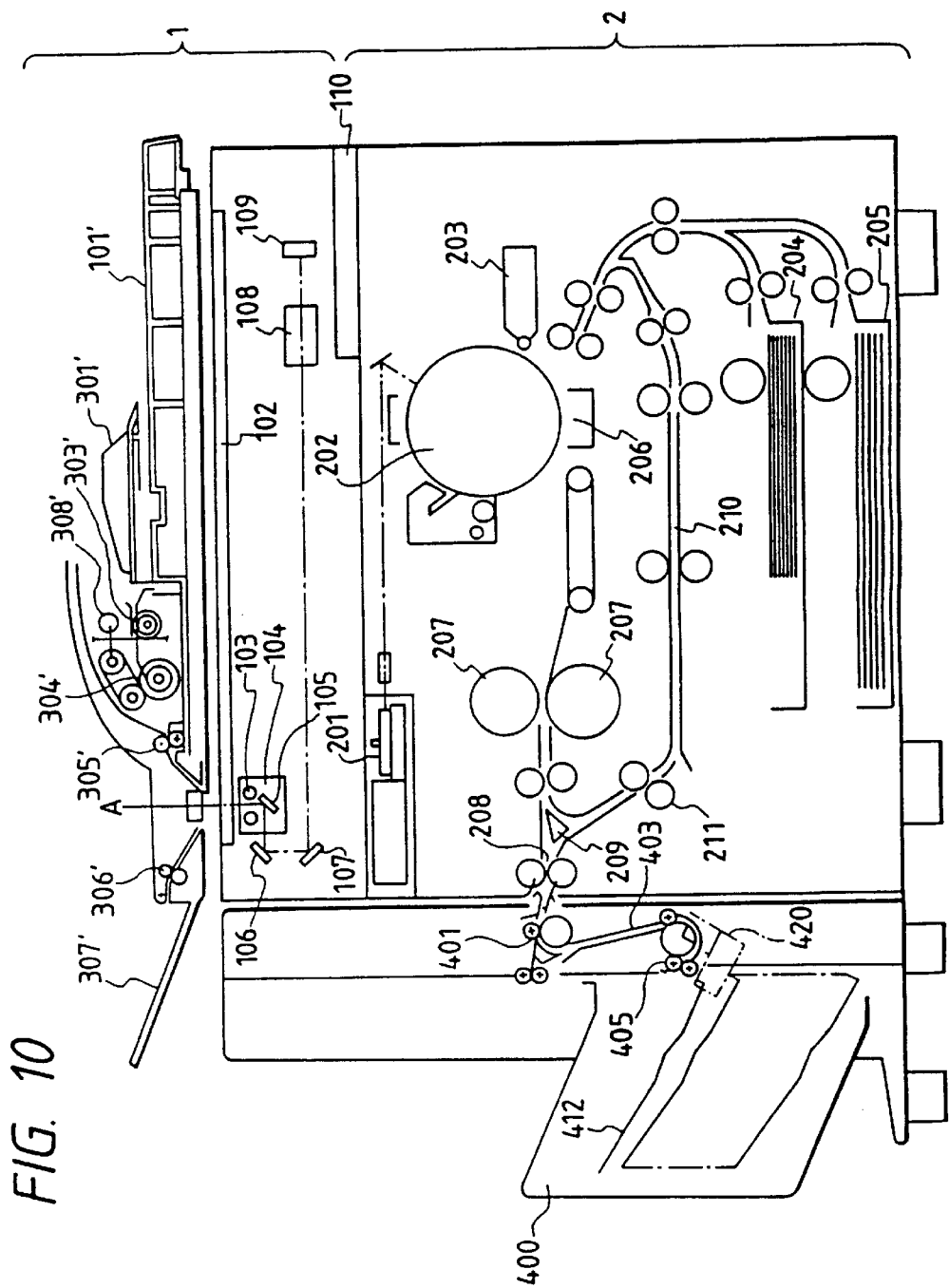
FIG. 10 is a sectional view showing the arrangement of a reader unit and a printer unit according to the second embodiment of the present invention.

FIG. 10 is a sectional view of the arrangement which stacks originals in the face-down state. In this embodiment, a printer unit 2 is the same as that in the first embodiment. The arrangement and operation of a reader unit 1 will be described below.

Originals which are stacked, in the face-down state, on a stacker tray 301' of an original feeder 101' are sequentially conveyed one by one onto a platen glass 102. The stacker tray 301' has a widthwise direction regulating plate for regulating an original in its widthwise direction perpendicular to its feed direction so as not to skew the original in an original feed operation. The regulating plate is slidable in a direction perpendicular to the feed direction of the original.

A lower separation operation of a bundle of originals, i.e., an operation for feeding the bundle of originals in turn from the first page will be explained below. The bundle of originals are separated one by one from the lowermost original by a roller 303' and separation rollers 304', and the separated original is conveyed to the exposure position on the platen glass 102 by convey rollers 305'. In this case, an image reading operation is started when the leading end of the original has reached a point A. Upon completion of the image reading operation, the original is exhausted onto an exhaust tray 307' by exhaust rollers 306'.

An upper separation operation of a bundle of originals, i.e., an operation for feeding a bundle of originals in turn from the last page will be explained below. The bundle of originals are separated one by one from the uppermost original by a pickup roller 308' and the separation rollers 304', and the separated original is conveyed by the convey rollers 305'. In this case, an image reading operation is started when the leading end of the original has reached the point A. Upon completion of the image reading operation, the original is exhausted onto the exhaust tray 307' by the exhaust rollers 306'.

When the leading end of the original is conveyed to the position of the point A, a lamp 103 of a scanner unit 104 is turned on to irradiate light onto the original. Light reflected by the original is incident on a CCD 109 via mirrors 105, 106, and 107, and a lens 108. Note that the scanner unit 104 moves to the exposure position where it can perform an exposure at the point A before the original is fed.

An operation panel disposed on the reader unit 1 has the same arrangement as that in the first embodiment.

The operation will be described below. In the first embodiment, originals are stacked in the face-up state, while in the second embodiment, originals are stacked in the face-down state. In this case, the operation is substantially the same as that in the first embodiment, except that the upper separation operation in the first embodiment is replaced by the lower separation operation, and the lower separation operation in the first embodiment is replaced by the upper separation operation.

(Modification of Embodiments)

In each of the above embodiments, original separation switching means is controlled by an output from image formation mode setting means. Alternatively, the image formation mode may be controlled by an output from the original separation switching means.

As described above, since originals can be read from the first page in a mode for copying images on one-side originals onto the two surfaces of sheets, a mode for copying a plurality of original images onto a single sheet, and the like, and the original count operation is not required in the apparatus, image formation efficiency can be improved. In addition, since a user need not input the number of originals, he or she is not required of performing cumbersome operations.

Since originals can be read from the first page in the facsimile-transmit mode, the file record mode, the transfer mode to an external computer, and the like, an image memory can be omitted, thus reducing the cost of the apparatus itself.

What is claimed is:

1. An apparatus comprising:

original feed means for feeding originals stacked on a stacking position to an exposure position one by one;

exposure means for exposing an image on the original fed to the exposure means onto a sheet, said image forming means being able to operate in a first mode for forming an image of a single original on a single sheet, and a second mode for forming images of a plurality of originals on a single sheet, wherein said original feed means comprises first feed means for the feeding the originals stacked at the stacking position in turn from a last page, and second feed means for feeding the originals stacked at the stacking position in turn from a first page, and said first feed means feeds the originals when said image forming means operates in the first mode, and said second feed means feeds the originals when said image forming means operates in the second mode, wherein the second mode is a mode of forming images of a plurality of originals next to each other on one surface of a single sheet. means operates in the second mode.

2. An apparatus according to claim 1 wherein said image forming means comprises reversing means for reversing the sheet on which the image is formed, said image forming means does not operate said reversing means when said image forming means operates in the first mode, and said image forming means operates said reversing means when said image forming means operates in the second mode.

3. An apparatus according to claim 1 wherein said first feed means separates and feeds a lowermost original of a bundle of originals which are stacked at the stacking position in a face-up state, and said second feed means separates and feeds an uppermost original of a bundle of originals which are stacked at the stacking position in a face-up state.

4. An apparatus according to claim 1 wherein said first feed means separates and feeds an uppermost original of a bundle of originals which are stacked at the stacking position in a face-down state, and said second feed means separates and feeds a lowermost original of a bundle of originals which are stacked at the stacking position in a face-down state.

5. A method of copying comprising the steps of:

feeding originals stacked on a stacking position to an exposure position one by one;

exposing an image on the original fed to the exposure position; and forming the image exposed by an exposure means onto a sheet, said step of forming the image being operable in a first mode for forming an image of a single original on a single sheet, and in a second mode for forming images of a plurality of originals on a single sheet, wherein said step of feeding the originals comprises first feeding the originals staced at the stacking position in turn from a last page in the first mode, and secondly feeding the originals stacked at the stacking position in turn from a first page in the second mode, and wherein the second mode is a mode for forming images of a plurality of originals next to each other on one surface of a single sheet.

6. A method according to claim 5, wherein said step of forming the image comprises the step of reversing the sheet on which the image is formed, said step of forming an image does not perform said step of reversing in the first mode, and said step of forming an image performs said step of reversing in the second mode.

7. A method according to claim 5, wherein said step of first feeding the originals comprises the steps of separating and feeding a lowermost original of a bundle of originals which are stacked at the stacking position in a face-up state, and said step of secondly feeding the originals comprises the steps of separating and feeding an uppermost original of a bundle of originals which are stacked at the stacking position in a face-up state.

8. A method according to claim 5, wherein said step of first feeding the originals comprises the steps of separating and feeding an uppermost original of a bundle of originals which are stacked at the stacking position in a face-down state, and the step of secondly feeding the originals comprises the steps of separating and feeding a lowermost original of a bundle of originals which are stacked at the stacking position in a face-down state.

9. A copying apparatus comprising:

original feed means for feeding originals stacked at a stacking position to an exposure position one by one;

exposure means for exposing an image on the original fed to the exposure position; and image formation means for forming the image exposed by said exposure means, onto a sheet, wherein said original feed means comprises first feed means for feeding a lowermost original in a bundle of originals stacked at the stacking position in face-up state, and second feed means for feeding an uppermost original in the bundle of originals stacked at the stacking position in the face-up state, said image formation means discharges the sheet in either one of the face-up state and a face-down state, and said copying apparatus has a first mode wherein said first feed means feeds the original and said image formation means discharges the sheet in the face-up state, and a second mode wherein said second feed means feeds the original and said image formation means discharges the sheet in the face-down state.

10. A copying apparatus comprising:

original feed means for feeding originals stacked at a stacking position to an exposure position one by one;

exposure means for exposing an image on the original fed to the exposure position; and image formation means for forming the image exposed by said exposure means, onto a sheet, wherein said original feed means comprises first feed means for feeding the originals stacked at the stacking position in turn from a last page, and second feed means for feeding the originals stacked at the stacking position in turn from a first page, said image formation means discharges the sheet in either one of the face-up state and a face-down state, and said copying apparatus has a first mode wherein said first feed means feeds the original and said image formation means discharges the sheet in a face-up state, and a second mode wherein said second feed means feeds the original and said image formation means discharges the sheet in a face-down state.

* * * * *